United States Patent [19]

Ullmann

[11] 4,237,370
[45] Dec. 2, 1980

[54] PULSE GENERATOR FOR METAL MACHINING BY ELECTRIC DISCHARGES

[75] Inventor: Werner Ullmann, Muralto-Locarno, Switzerland

[73] Assignee: Elmapa N.V., Willemstad, Netherlands Antilles

[21] Appl. No.: 911,988

[22] Filed: Jun. 2, 1978

[30] Foreign Application Priority Data

Jun. 3, 1977 [CH] Switzerland .................. 6878/77

[51] Int. Cl.³ .............................................. B23P 1/08
[52] U.S. Cl. .................. 219/69 P; 219/69 C
[58] Field of Search ..................... 219/69 P, 69 C

[56] References Cited

U.S. PATENT DOCUMENTS

| | | | |
|---|---|---|---|
| 3,485,990 | 12/1969 | Sennowitz | 219/69 C |
| 3,492,530 | 1/1970 | Ullmann et al. | 219/69 C |
| 3,832,510 | 8/1974 | Pfau et al. | 219/69 P |
| 4,004,123 | 1/1977 | Inoue | 219/69 C |

*Primary Examiner*—B. A. Reynolds
*Assistant Examiner*—Clifford C. Shaw
*Attorney, Agent, or Firm*—Lane, Aitken, Ziems, Kice & Kananen

[57] ABSTRACT

A pulse generator for metal machining by electric discharges, comprising a primary current circuit for producing and transmitting pulse forms to a pair of electrodes. A voltage and/or current source is arranged in the low-ohm and low-loss primary current circuit, the voltage of which has a value which is only that much greater than the operating voltage of the pulses flowing through the spark gap as is needed to positively overcome the voltage losses occurring in the primary current circuit. A signal generator produces a signal corresponding to the desired current pulse shape or form. A comparator, which has a switch arranged in the primary current circuit for regulating the current flow in such primary current circuit, controls the current flowing through the primary current circuit, as a function of the desired pulse form produced by the signal generator and a magnitude of the current flowing in the primary current circuit which is tapped-off by a measuring feeler. A magnetic energy storage arranged in the primary current circuit and having a switch in parallel to the work gap produces a voltage having a value greater than the voltage of the current and/or voltage source, and the primary current circuit is designed such that there is only present stray capacitance.

9 Claims, 5 Drawing Figures

PULSE GENERATOR FOR METAL MACHINING BY ELECTRIC DISCHARGES

BACKGROUND OF THE INVENTION

The present invention relates to a new and improved construction of generator for producing pulses for metal machining by electric discharges, the generator being of the type comprising a primary or main current circuit for generating and transmitting pulse forms or shapes to a pair of electrodes.

During the machining of metals by electric discharges it has been found that the most different types of pulse forms or shapes favorably affect the desired material removable at the workpiece electrode and the undesired wear at the tool electrode. Hence, pulse generators have been developed and have become known to the art which form the pulse shapes applied to the spark gap from a number of basic shapes or forms. This forming of such pulse shapes or pulse forms is accomplished in that a number of parallel current circuits can be connected by switches with the spark gap. In each of the current circuits there is produced a basic form of shape of the pulses. Now if the switches are closed in the proper timewise sequence, then composite pulse forms or shapes appear at the spark gap. However, with these state-of-the-art generators there exists the drawback that synchronization of the operation of the switches, and thus, the timewise coordination of the individual basic form of the pulses cannot be optimumly realized. A further drawback is that for reasons of economies of the system design there can only be provided a certain number of parallel current circuits, and thus, there is extremely limited the selection of the pulse forms or shapes which are applied at the spark gap. This selection limitation no longer is capable of keeping up with the enlarged fields of application of electric discharge metal machining which increase from year to year. In other words, this means that the prior art generators are not capable of fulfilling the demands for as large as possible selection of the pulse forms or shapes. Such generators have been described in Swiss Pat. No. 382,323 (AGIE, Grauert), in the book "GENERATORI IMPULSOV" by Liwschiz, Rogazev and Otto, Publisher Energija, Moscow 1970, Chapter 9-2, and in the Russian publication "Elektrophysikalische und Electrochemische Technologie", (translated basically as "Electrophysical and Electrochemical Technology") Volume 8, Moscow, 1976, "Auswahl von Parametern Für elektroerosive Impulse" (translated basically as "Selection of Parameters for Electro-erosion Pulses"), article by Henna and Otto. In German patent publication No. 25 47 767 there is described a generator which can produce pulse shapes of any desired type. This is accomplished in that there is produced a so-called envelope curve pair constituting a lower and upper peak for the shape of the desired work pulses. Furthermore, a voltage source is provided at the primary current circuit, this voltage source possessing such a high voltage that there can be ignited the work spark in the work gap. When such voltage is not provided then can be used an additional voltage source in a parallel arrangement. This additional voltage is superimposed upon the voltage of the primary source. Furthermore, this generator functions by using the switch arrangement taught in Swiss Pat. No. 382,323. The generator described in the aforementioned German patent publication 25 47 767 is extremely complicated, and owing to its special design and configuration and individual circuit components is associated with difficulties in realizing a practical circuit design.

SUMMARY OF THE INVENTION

Hence, with the foregoing in mind it is a primary object of the present invention to provide a new and improved construction of pulse generator for metal machining by electric discharges which is not associated with the aforementioned drawbacks and limitations of the prior art proposals.

Another and more specific object of the present invention aims at eliminating the drawbacks of the prior art generators and insuring for a random selection of pulse shapes or forms.

Still a further significant object of the present invention aims at eliminating the losses which are produced with the state-of-the-art generators due to the presence of current-limiting resistors.

In keeping with the immediately preceding object the invention dispenses with the need for an auxiliary voltage source or auxiliary current source, which, in the case of the prior art generators, are used for igniting the work pulses at the work gap.

Another significant object of the present invention is to provide a generator, which, notwithstanding the unlimited selection possibility of the different pulse forms or shapes, can be realized by the use of simpler and more easily monitorable switching circuits, and which generator, among other things, utilizes power switches arranged parallel to the spark gap and having an energy storage, and not switches connected in series, as is the case with the heretofore known generators.

Now in order to implement these and still further objects of the invention, which will become more readily apparent as the description proceeds, the pulse generator of the present development is manifested by the features that there are provided:

(a) a voltage and/or current source (sometimes briefly referred to simply as a "power source") in the low-ohm and low-loss primary or main current circuit, the voltage of which has a value which is only that much greater than the operating or working voltage of the pulses flowing through the spark gap as is needed to positively overcome the voltage losses arising at the primary current circuit;

(b) a signal generator which produces a signal corresponding to the desired current pulse form or shape;

(c) a comparator controlling a switch arranged in the primary current circuit for regulating the current flow in the primary current circuit as a function of the desired pulse shape produced by the signal generator and the value of the current flowing in the primary current circuit which is tapped-off by a measuring feeler; and (d) a magnetic energy storage arranged in the primary current circuit and having a switch in parallel to the work gap for producing a voltage, the amplitude of which is greater than that of the voltage of the current and/or voltage source, and the primary current circuit is designed such that there is only present stray capacitance.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
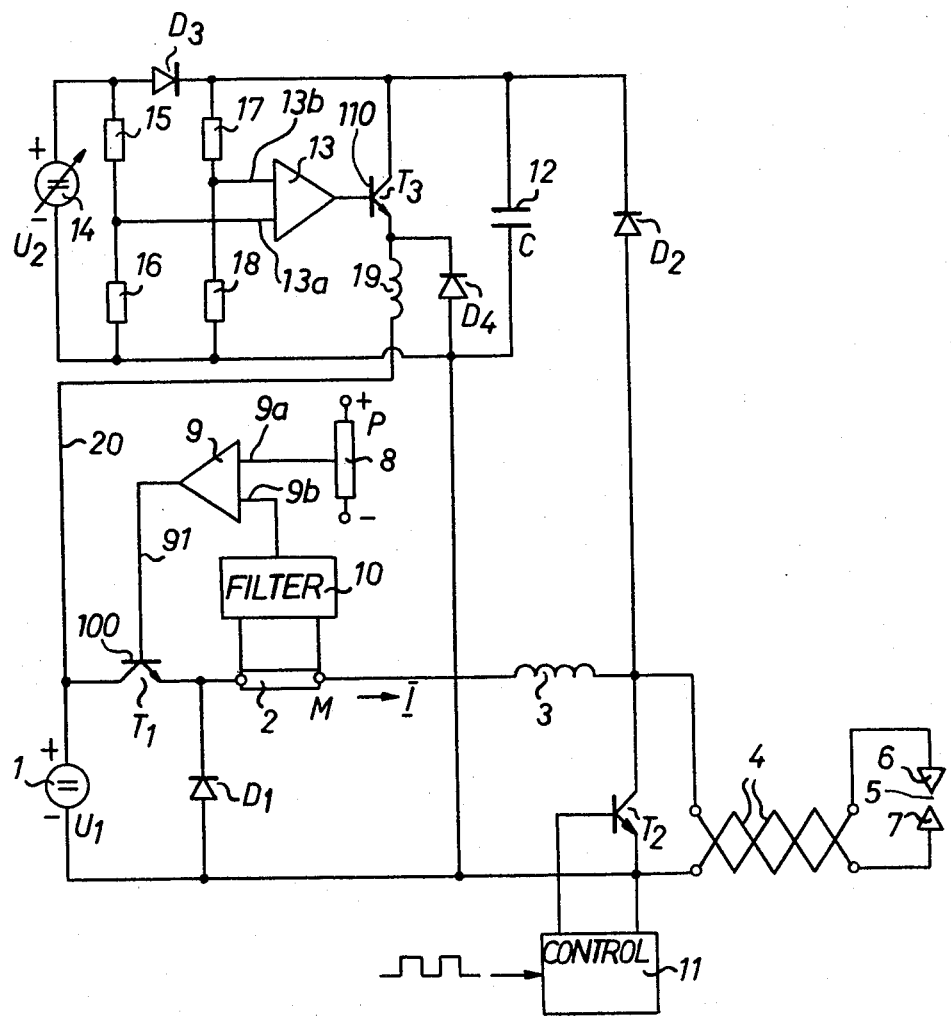
FIG. 1 is a circuit diagram illustrating the principle construction of an exemplary embodiment of pulse generator constructed according to the teachings of the present invention.

Describing now the drawings, in FIG. 1 there is shown a simple construction of pulse generator designed according to the teachings of the present invention. The primary current circuit comprises a power source 1, which may be a suitable voltage or current source, here referred to as the voltage source 1, a transistor T1, a measuring or measurement feeler 2, which can be designed as a resistor or as a current convertor, a magnetic storage 3, which can be a self-inductive coil or choke, the non-induction infeed lines or conductors 4 leading to the spark gap 5 which is formed by the tool electrode 6 and the workpiece electrode 7. Furthermore, a power transistor T2, arranged parallel to the spark gap 5, is controlled by a control device 11. Additionally, there is arranged in the primary current circuit the diode D1. The aforementioned transistors T1 and T2 have only been shown individually in the drawings for clarity in illustration and simplification thereof. Normally, however, there are utilized so-called transistor packs i.e., parallelly connected and controllable transistors.

Figure 2:
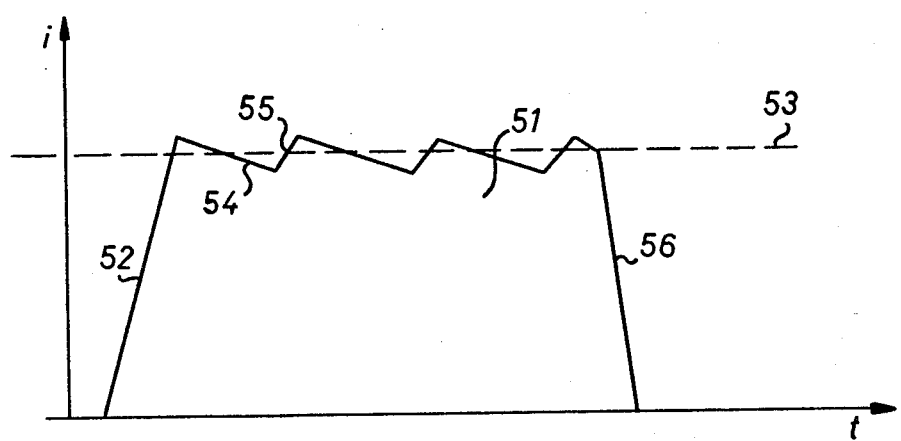
FIG. 2 graphically illustrates a simple pulse form or shape.

The pulse shaping circuit which controls the transistor pack T1, consists of the generator 8, the comparator 9 and the filter 10. The generator 8 can be a function generator, an adjustable potentiometer or a predetermined reference voltage. The function generator 8 produces any desired wave shape or form of the pulses. There are also produced such pulse-wave shapes which are composed of individual curves or curve sections. In the embodiment under discussion it is assumed that the wave shape should be square or rectangular. Hence, it is sufficient to employ a potentiometer 8 which delivers the square wave reference-pulse shape as amplitude to the one input 9a of the comparator 9. At the second input 9b of such comparator 9 there is applied the mean voltage value emanating from the filter 10. The filter 10 taps-off at the measuring feeler 2 the voltage drop which is produced by virtue of a current flowing in the primary circuit. In the present case the transistor pack T1 should be blocked, i.e., non-conductive, so that there is not present any current flow in the primary current circuit. The comparator 9 now determines that there is available at the potentiometer 8 only a reference value-potential (sometimes also referred to as "reference potential"), whereas there is not present at the filter 10 any actual value-potential (sometimes also referred to as actual potential). There is applied by the comparator 9 through the output line 91 a control signal to the base 100 of the transistor pack T1. This control signal switches-through, i.e., renders conductive the entire transistor pack T1. Due to the influence of the voltage source 1 a current can flow in the primary current circuit when the transistor pack T2 is brought into its conductive state by the control circuit 11. As a result, there is an increase of the current which flows through the voltage source 1, transistors T1, T2, measuring feeler 2, and magnetic storage 3. This current increase has been shown in FIG. 2 as the ascending edge or slope 52 of the pulse 51. In the graph of FIG. 2, there has been portrayed the most simple pulse form or shape, namely the square wave shaped pulse. When the reference value 53 of the pulse 51, which has been set at the potentiometer 8, has been exceeded by the actual value of the ascending edge 52 which is tapped-off at the measuring feeler 2, then the comparator 9 delivers a signal by means of the line or conductor 91, so that the transistors or transistor pack T1 are blocked. The transistors or transistor pack T2 are still conductive or switched through.

Since the voltage U1 of the source 1 is turned-off by the blocked transistor T1, the freewheeling current 54 flows through the freewheeling diode D1, measuring feeler 2, storage 3, and transistors T2. The freewheeling current 54 exceeds the reference value 53 of the pulse 51, and this fact is communicated to the measuring feeler 2 and filter 10 by means of the comparator 9. The comparator 9 produces at the line or conductor 91 a signal which again places the transistors T1 into their conductive state and turns on the voltage U1 of the source 1. Now the charging current 55 flows through the measuring feeler 2, storage 3 and transistors T2. The cycle of the flow of the freewheeling current 54 and the charging current 55 repeats for such length of time as the transistors T2 are in their conductive state. At this point it is mentioned that the transistors T1 of FIG. 1 are controlled so as to be conductive and non-conductive or blocked several hundred or thousand times during the duration of a pulse form or shape 51 as shown in FIG. 2. These transistors ensure that the pulse shape 51 desired by the setting of the potentiometer 8 truly is produced in the primary current circuit. The transistors T2 ensure for the generation of the work pulses at the work gap 5. These work pulses, which jump across the work gap 5, of course have the same form or shape as the pulses 51 in the primary current circuit. The storage 3, which in the exemplary embodiment under discussion is a magnetic storage having a certain inductance, is charged by the current pulse 51 with the magnetic energy $\frac{1}{2} LI^2$. Now, if the transistors T2 are blocked, then there is formed the descending edge 56 of the current pulse 51 shown in FIG. 2. At this point in time the voltage at the storage 3 increases according to the following equation:

$$\tfrac{1}{2}LI^2 = \tfrac{1}{2}CU^2.$$

In the foregoing equation, reference character L represents the inductance, reference character C the stray capacitance of the primary current circuit, reference character I the current which flows through the primary current circuit, and reference character U the now present high voltage.

Owing to this high voltage, which is appreciably greater than the 30 Volts of the constant voltage U1 of the voltage source 1, there is now ignited a work pulse or work spark across the work path or gap 5 between the pair of electrodes 6 and 7. The current flows from the magnetic storage 3 via the low induction lines or conductors 4, work gap 5, voltage source 1, transistors T1, which again are in their conductive state, and the measuring feeler 2. The transistors T1 have been switched into their conductive state because according to the descending edge or slope 56 of the current pulse, the actual value has dropped below the reference value 53. In this case the comparator 9 delivers a signal by means of the line 91 which again places the transistors T1 into their conductive state. Since in the low-loss and low-ohm primary current circuit 1, T1, 2, 3, T2, D1 there has flowed an intense current having an amplitude of about 200 amperes, the storage 3 was capable of storing an extremely high amount of energy. In accordance with the indicated equation given above the voltage appearing at the storage 3 is appreciably greater than the 30 Volts of the constant voltage source 1. The control circuit or device 11 now blocks the transistors or transistor pack T2. As soon as the transistors or transistor pack T1 have been brought into the conductive state by means of the comparator 9 and the line or conductor 91, there occurs the rise or ascending edge 52 of the next current pulse 51 in the primary current circuit. There now again begins the same operations for forming a current pulse 51 as already described above. When the transistors T2 have been controlled so as to be non-conductive by means of the control circuit 11, then there again is formed an extremely high voltage at the storage 3 which passes across the work gap 5. It is here again mentioned that the transistors T1, controlled by the comparator 9, are responsible for the actual shape or form of the pulses in the primary current circuit. The transistors T2, controlled by the control circuit 11, when in their conductive state allow the flow of the actual pulse shape in the primary current circuit and in their other switched state the flow of the work pulses across the work gap 5. The transistors T1 and T2 can be operated independently of one another or by means of a common timewise synchronization. At this point it is further mentioned that during the different switching cycles of the transistors T1 and T2 frequently the energy of the energy storage 3 has not been completely consumed by the work pulse appearing at the work gap 5. This so-called residual energy is not lost, rather is used for the timewise successive energy build-up in the storage 3, which begins when the transistor T1 is controlled so as to be conductive. As a result, energy is saved from the constant voltage source 1.

Now, if there are desired different pulse forms or shapes, then the potentiometer 8 of the circuit arrangement of FIG. 1 is replaced by a function generator as such will be described and illustrated more fully in conjunction with the disclosure regarding FIG. 3. The transistors T1 control the current pulse 51 shown in FIG. 2 and flowing in the primary current circuit such that its actual value follows the reference value-wave course. This is accomplished in that during the time of the pulse 51 the transistors T1 are frequently brought into their conductive state and their non-conductive or blocked state, respectively. This has already been described previously in conjunction with the disclosure of the circuitry shown in FIG. 1. With the circuit arrangement of FIG. 1 it is possible to clip predetermined pulse forms or shapes, such as for instance sinusoidal wave shapes, which have been determined by the generator 8, so that there can be produced from parts of the sinusoidal wave shapes or trains sawtooth-shaped pulses. This example can be randomly augmented.

Additionally, in FIG. 1 there is provided a current circuit serving to limit the voltage at the electromagnetic storage 3. As already mentioned, after blocking of the power transistors T2 the voltage at the electromagnetic storage 3 increases according to the equation $\frac{1}{2}LI^2 = \frac{1}{2}CU^2$. When this voltage at the storage 3 is greater than a voltage U2 predetermined by the source 14, then there is tapped-off the higher voltage at the capacitor 12. There will now be described more fully the exact function of this voltage limiting action. The pre-selectable high-ohm voltage source 14 with current-limiting, in the embodiment under discussion, should be set to 200 Volts. By means of the diode D3 the capacitor 12 charges to a potential of 200 Volts. The comparator 13 has applied thereto by means of its one input 13a the reference or reference value voltage of the high-ohm voltage source 14. The comparator 13 receives the reference value of the high-ohm voltage source 14 by means of the resistors or resistances 15 and 16 and the actual value of the voltage at the capacitor 12 by means of the resistors or resistances 17 and 18. Now, when both voltages coincide, for instance amount to 200 Volts, then the comparator 13 does not supply any output signal to the transistor T3. It is here assumed at this point that the voltage at the energy storage 3 is greater than 200 Volts. In this case current flows across the diode D2 to the capacitor 12 and increases its voltage beyond 200 Volts. This in turn causes a change of the actual value signal of the resistors 17 and 18. The reference value of the voltage source 14 across the resistors 15 and 16 remains constant. In this case the comparator 13 delivers an output signal to the base 110 of the transistor T3 which is now switched into its conductive state. The overvoltage of the capacitor 12 discharges through the induction coil 19, the energy of which is discharged through the freewheeling diode D4. This excess energy reaches the operating voltage source 1 by means of the line or conductor 20. Here it is employed as useful energy for the sparks appearing at the work gap 5. In this way there can be effectively avoided any energy waste.

Figure 3:
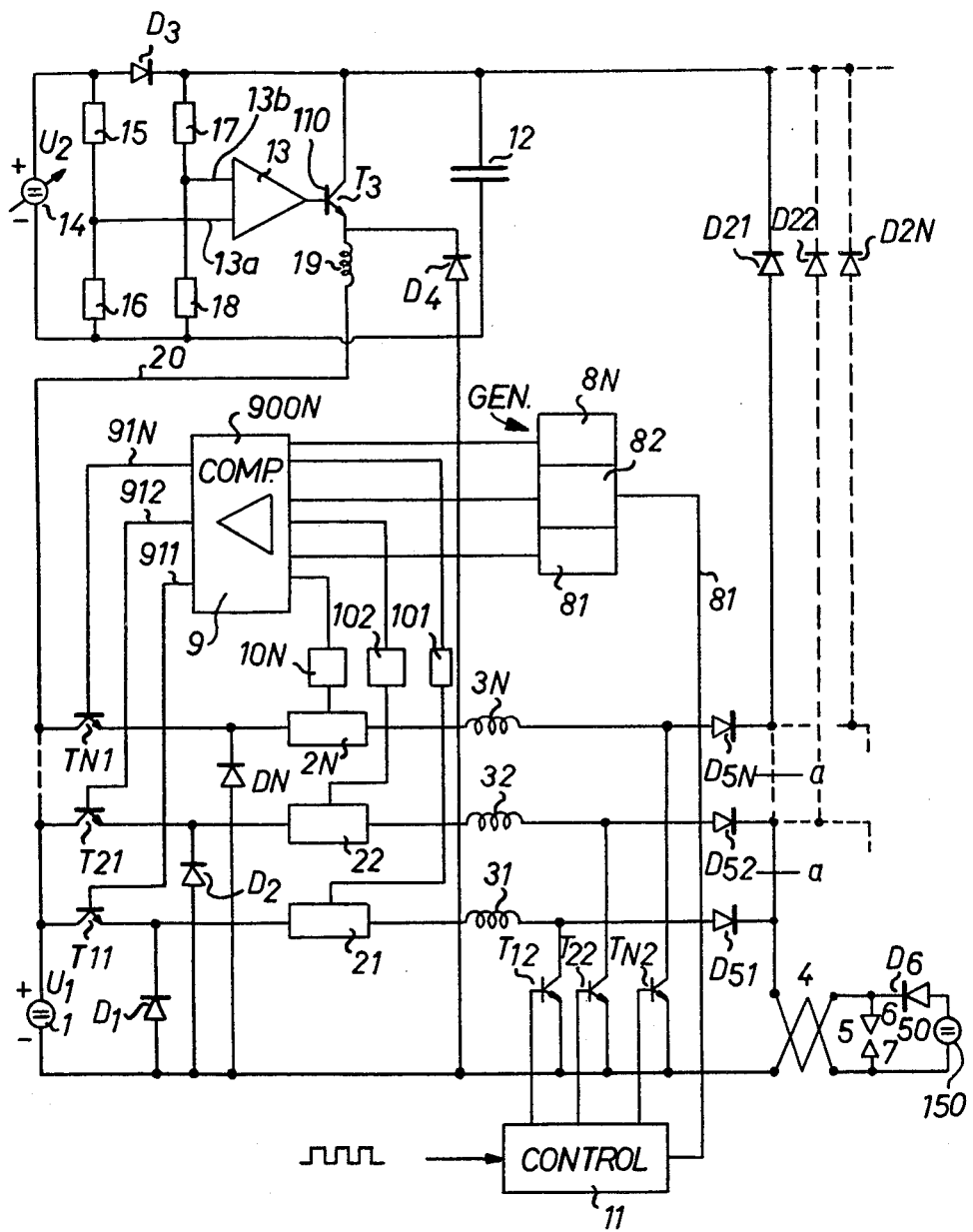
FIG. 3 is a circuit diagram of a pulse generator for producing step-shaped pulse flanks or slopes.

Continuing, FIG. 3 illustrates a circuit whose primary or main current circuit consists of a number of parallel branches. There can be provided N-number of such branches. For all of the branches there is provided a control device or circuit 11 and a voltage source having a constant voltage $U_1$ of, for instance, about 30 Volts and a current of, for instance, about 200 amperes. For all of the branches there can be employed a generator 8. In the exemplary embodiment of FIG. 3, however, each branch has its own generator 81, 82, 8N. The first branch consists of one or a number of low-voltage transistors T11, a measuring feeler 21, an electromagnetic storage 31, diodes D1, D51, one or a number of power transistors T12. The package of power transistors T12 is controllably connected with the control device 11. The package of low-voltage transistors T11 is connected by means of the line or conductor 911 at the output side of the comparator, generally indicated again by reference character 9. As already mentioned with regard to the circuitry of FIG. 1, comparator 9 is connected with the generator 8 and with the filter or detector 10. In the arrangement shown in FIG. 3, each branch of the primary current circuit is provided with its own comparator 9 ... N (also indicated simply by reference character 900N), own filter 101, 102, 10N inclusive of the measuring feelers 21, 22, 2N and own generator 81, 82 8N respectively. The second branch of the primary current circuit consists of one or a number of transistors T21, a measuring feeler 22, an electromagnetic storage 32 and the diodes D2, D52. The power transistors T22 are controllably connected with the control device 11. The low-voltage transistors T21 are connected by means of the line or conductor 912 with the related comparator 9. This second branch is connected parallel to the first branch. At the circuit node or location a this second branch can be separated from the first branch if, for instance, there is used as the tool a multiple-electrode 6. In this case part of the electrode 6 is powered by the first branch by means of the lines 4, as has been shown in FIG. 3. The other part of the tool electrode 6 is powered by means of the broken line 4.

In FIG. 3 the third branch is illustrated symbolically for a certain number N of branches. This third branch contains the same components as the other branches, such as for instance, the low-voltage transistors TN1, the measuring feeler 2N, the electromagnetic storage 3N, the diodes DN and D5N. This nth-branch normally is arranged parallel to the other branches at the indicated infeed line or conductor 4. However, it also can be separated from the other branches at the location a, something which is accomplished in the case of a multiple-electrode 6. In this case, the nth-branch powers part of the multiple-electrode 6 by means of the infeed line or conductor shown in broken lines. In FIG. 3, all of the low-voltage transistors T11 to TN1 are connected by means of the lines 911, 912 and 91N with the output side of the comparator 9 . . . N. Further, the measuring feelers 21, 22, 2N are connected with the filters or detectors 101 to 10N. The generator 8 delivers the desired pulse shape or form to the other inputs of the individual comparators 9. In the upper portion of the showing of FIG. 3 there is illustrated the current circuit for the voltage-limiting of the individual electromagnetic storages 31, 32, 3N. The pre-selectable and high-ohm voltage source 14 has a voltage U2 of, for instance, 70–350 Volts and a current of, for instance, approximately 0.2 amperes. As already described in conjunction with the circuitry of FIG. 1, there is pre-set at this pre-selectable, high-ohmic voltage source the voltage U2 provided for the electromagnetic storages. By means of the high-ohm resistors 15 and 16 the pre-selected voltage value U2 of the high-ohm voltage source 14 is applied to the comparator 13.

The capacitor 12 is charged by means of the diode D3 to the pre-selected voltage value U2. During the electric metal removal process which is accomplished at the work gap 5 there is applied to each of the electromagnetic storages 31, 32, 3N, a voltage which corresponds to the previously mentioned equation $\frac{1}{2}LI^2 = \frac{1}{2}CU^2$. As long as this voltage U at each of the electromagnetic storages is below the voltage value U2 of the charged capacitor 12, then no current flows across the diodes D21, D22 and D2N. The capacitor 12 remains charged at the voltage value U2. This voltage value is also applied by means of the voltage divider composed of the resistors 17 and 18, as a so-called actual value to the other input 13b of the comparator 13. In this case, the comparator 13 delivers an output signal to the base 110 of the high-voltage transistor T3 which is blocked. Consequently, no current can flow through this transistor T3 and through the inductance 19 to the voltage source 1 at the operating voltage U1. If, however, the voltage value U appearing at one of the electromagnetic storages 31, 32, 3N is greater than the voltage value U2 of the capacitor 12, then current flows out of the relevant branch via the diode D21, D22, D2N and charges the capacitor 12 to this higher value. At this point in time there is applied by means of the voltage divider composed of the resistors 17 and 18 the new actual value to the other input 13b of the comparator 13. Since the reference value from the voltage divider circuitry composed of the resistors 15 and 16 no longer coincides with the now increased actual value, the comparator 13 delivers an output signal to the base 110 of the transistor T3 which is controlled so as to become conductive. There now flows the higher charge from the capacitor 12 by means of the inductance 19 into the battery or power supply 1, and the inductance 19 is discharged by means of the freewheeling diode D4, so that no energy is lost.

The embodiment of FIG. 3 shows that by means of the generator 8, which can be a programmable selection storage (PROM), and by means of the control device 11, it is possible to generate pulse shapes or forms whose ascending edges or slopes and descending edges or slopes are step-like or step-shaped. In each of the mentioned branches of the primary current circuit there is produced a step of the ascending edge and descending edge, respectively. The individual steps are added so that there is formed a step-shaped work pulse. The control of the individual branches by the related low-voltage transistors T11 to TN1 and by means of the high-voltage transistors or power transistors T12 to TN2 is synchronized in time such that there are produced step-shaped or step-like work pulses. This is accomplished in the appropriate manner by means of the control device 11. Finally, direct current-voltage source 150 and a diode D6 are connected parallel to the work gap 5 for electrically cleansing such work gap.

Figure 4:
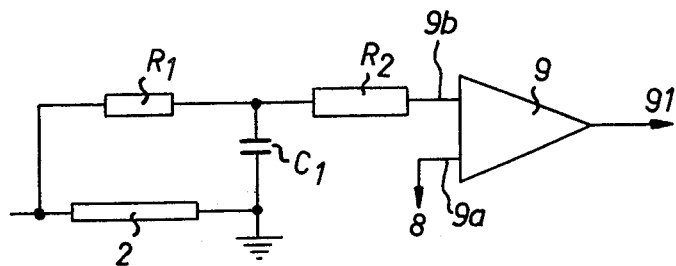
FIG. 4 is a circuit diagram illustrating details of the filter used in the arrangements of FIGS. 1 and 3.

Now, in FIG. 4, there are shown circuit details of the filter 10 used in the circuitry of FIGS. 1 and 3. The resistor 2 detects the voltage drop produced by the flow of the pulse 51 in the primary current circuit. By means of the resistors $R_1$ and $R_2$ as well as the capacitor $C_1$ this value of the potential or voltage drop is applied to the one input 9b of the comparator 9. The other input 9a of this comparator 9 has applied thereto the reference value which is delivered by the generator 8.

Figure 5:
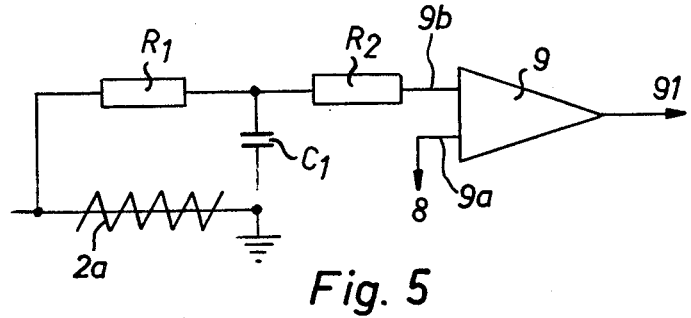
FIG. 5 is a circuit showing details of the current converter which can be used in the arrangements of FIGS. 1 and 3.

Finally, it will be recalled that the measuring feeler 2 can be in the form of a resistor or a current converter, as explained previously in conjunction with the circuitry of FIG. 1. Now, in FIG. 5 there is illustrated a current converter 2a which is used in place of the shunt resistor 2 of the circuitry shown in FIG. 4 in the primary or main current circuit. The other components $R_1$, $R_2$, $C_1$ and the comparator 9 are the same as discussed above in conjunction with FIG. 5.

While there are shown and described present preferred embodiments of the invention, it is to be distinctly understood that the invention is not limited thereto, but may be otherwise variously embodied and practiced within the scope of the following claims.

Accordingly, what is claimed is:

1. A generator for generating pulses for metal machining by electric discharges across a work gap defined by a pair of electrodes, comprising:
   means providing a low-ohm and low-loss primary current circuit for producing and transmitting pulse shapes to the pair of electrodes;
   said primary current circuit containing a power source furnishing a voltage having a value which is only that much greater than the operating voltage of a pulse flowing through the work gap as is needed for positively overcoming voltage losses arising at the primary current circuit;

a signal generator connected in circuit with the primary current circuit for producing a signal pulse corresponding to a desired current pulse shape;

said primary current circuit containing switch means for regulating the current flow in the primary current circuit and measuring feeler means;

a comparator for controlling said switch means as a function of the desired pulse shape generated by the signal generator and the value of the current flowing through the primary current circuit and tapped-off by the measuring feeler means;

said primary current circuit further comprising magnetic energy storage means and additional switch means connected parallel to said work gap for producing a voltage whose value is greater than the voltage of the power source;

said primary current circuit being structured such that there is only present stray capacitance; and means for preventing the presence of too great a voltage; at the energy storage means comprising: a voltage source for providing a reference voltage; a comparator for comparing the reference voltage provided by the voltage source with an actual voltage appearing at the energy storage means; and semi-conductor switch means controlled by said comparator to enable discharge of excessive voltage in the presence of too high a voltage at the energy storage means.

2. The generator as defined in claim 1, wherein: said power source comprises a voltage source.

3. The generator as defined in claim 1, wherein: said power source comprises a current source.

4. The generator as defined in claim 1, wherein:

said switch means arranged in said primary current circuit and controlled by said comparator comprises semiconductor switch means for turning-on or turning-off said power source;

said additional switch means comprises semiconductor switch means; and said primary current circuit further containing a diode.

5. The generator as defined in claim 4, wherein:

said switch means controlled by said comparator is capable of assuming two switching states defining a first switching state and a second switching state;

said first switching state increasing the current flow of the current pulses flowing in the primary current circuit; and said second switching state reducing the current flow of such current pulses.

6. The generator as defined in claim 1, wherein:

said additional switch means comprises semiconductor switch means arranged parallel to said work gap;

control circuit means for controlling said additional switch means for selectively assuming a first switching state and a second switching state;

said first switching state serving to generate a current pulse in the primary current circuit; and said second switching state serving to generate a work pulse at the work gap.

7. The generator as defined in claim 1, further including:

connection means between said primary current circuit and said work gap; and said connection means being of low induction and low-ohmic.

8. The generator as defined in claim 1, further including:

a direct current-voltage source and a diode connected in parallel to the work gap for electrically cleansing the work gap.

9. A generator for generating pulses for a metal machine by electric discharges across a work gap defined by a pair of electrodes comprising:

means providing a low ohm and low loss primary current circuit for producing and transmitting pulse shapes to the pair of electrodes;

said primary circuit containing a power source furnishing a voltage having a value which is only that much greater than the operating voltage of a pulse flowing through the work gap as is needed for positively overcoming voltage losses arising at the primary current circuit;

reference signal means connected in circuit with the primary current circuit for producing a signal level corresponding to a desired current level;

said primary current circuit containing switch means for regulating the current flow in the primary current circuit and measuring feeler means;

a comparator for controlling said switch means as a function of the desired current level represented by the reference signal and the value of the current flowing through the primary current circuit and tapped off by the measuring feeler means;

said primary current circuit further comprising magnetic energy storage means and additional switch means connected in parallel to said work gap for producing a voltage value that is greater than the voltage of the power source;

said primary current circuit being structured such that there is only present stray capacitance; and means for preventing undesired voltage increases arising at said energy storage means;

said preventing means comprising:

a capacitor chargeable by a reference voltage and connected so that the current arising from an overvoltage at the storage means flows into said capacitor;

a second comparator comparing the voltage across said capacitor with said reference voltage; and switching means controlled by said comparator connected to provide a backflow of energy from the storage means into the power source when an overvoltage arises at said storage means.

* * * * *